United States Patent [19]

Bell et al.

[11] 4,386,950
[45] Jun. 7, 1983

[54] METHOD AND APPARATUS FOR PRODUCING SOLID HYDROGEN

[75] Inventors: Peter M. Bell, Potomac, Md.; Ho-Kwang Mao, Fairfax, Va.

[73] Assignee: Carnegie Institution of Washingtion, Washington, D.C.

[21] Appl. No.: 320,900

[22] Filed: Nov. 12, 1981

Related U.S. Application Data

[62] Division of Ser. No. 126,082, Feb. 29, 1980, Pat. No. 4,339,252.

[51] Int. Cl.³ .............................................. F25J 1/02
[52] U.S. Cl. ........................................... 62/10; 62/40
[58] Field of Search ................... 425/77, 78, 406, 411, 425/352, DIG. 26; 422/295–297; 249/134; 62/18, 35, 48

[56] References Cited

U.S. PATENT DOCUMENTS 3,690,116  9/1972  Cheng et al. ......................... 62/537

OTHER PUBLICATIONS

Physics Today, Dec. 1939, p. 35.
Temperature–Entropy Diagram for Parahydrogen.
Physical Chemistry, Walter J. Moore, 3rd Ed., pp. 102, 103, 1962.
Annual Report of the Director Geophysical Laboratory, Carnegie Institution, 1977–1978, pp. 904–913.
Science News, p. 156, Mar. 10, 1979, pp. 181, 182, Sep. 18, 1976.

Primary Examiner—Norman Yudkoff
Attorney, Agent, or Firm—Sughrue, Mion, Zinn, Macpeak and Seas

[57] ABSTRACT

A diamond-anvil, high-pressure cell having an apertured steel gasket interposed between the opposed diamonds is lowered into a liquified hydrogen bath at cryogenic temperatures. After the liquid hydrogen permeates the cell through the viewing apertures an initial sealing pressure is applied to the cell by a remotely operated threaded arrangement sufficient to prohibit escape of the liquified hydrogen from the aperture in the steel plate which is closed by the opposed diamonds. The cell is then typically removed from the liquified hydrogen bath and introduced into a lever type pressure applicator to further increase the pressure on the hydrogen at room temperature for the observation of its effects through suitable apertures in the cell and to convert the same to solid form.

2 Claims, 7 Drawing Figures

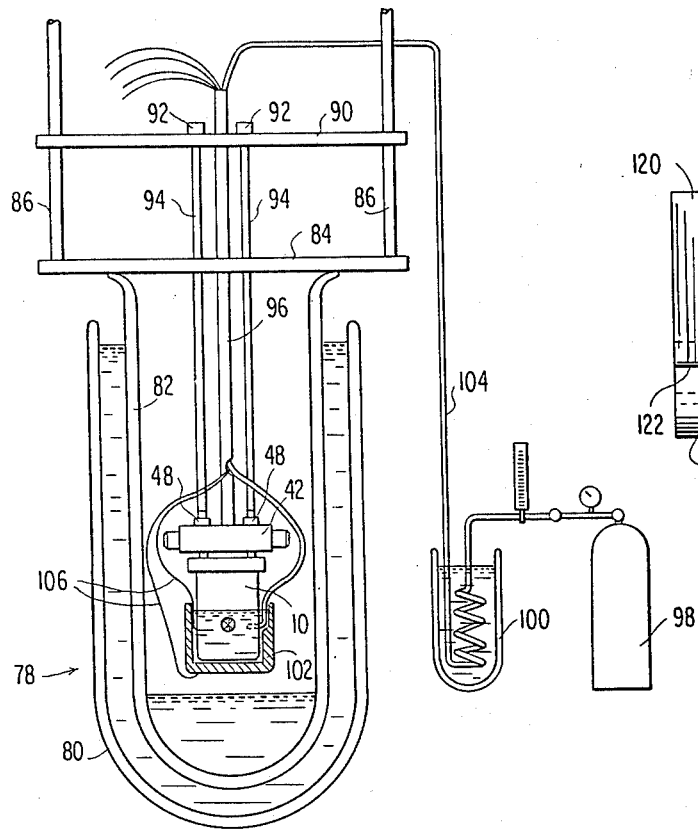
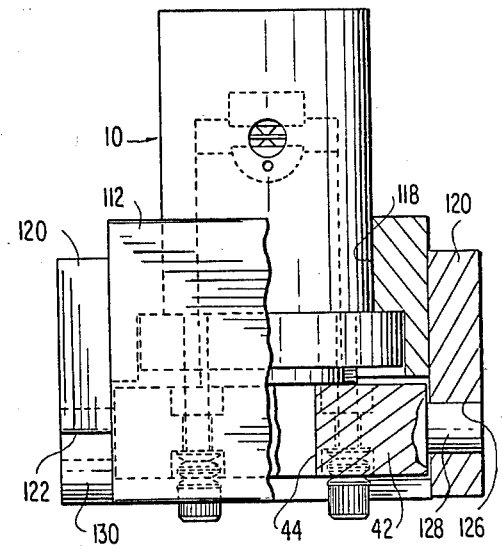
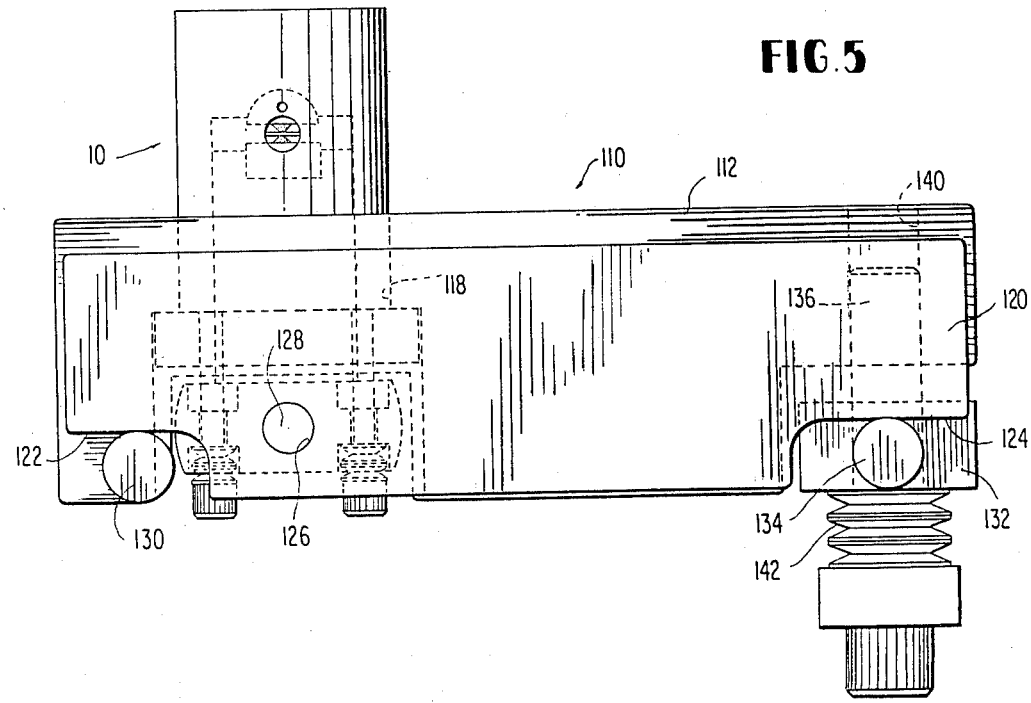

METHOD AND APPARATUS FOR PRODUCING SOLID HYDROGEN

This is a division of application Ser. No. 126,082, filed Feb. 29, 1980, now U.S. Pat. No. 4,339,252 dated Aug. 13, 1982.

BACKGROUND OF THE INVENTION

1. Field of the Invention

The present invention is directed to a method and apparatus for producing solid hydrogen and more specifically to a method for introducing hydrogen into a diamond-anvil, high pressure cell for subsequent high-pressure processing and the construction of the cell for carrying out the method.

2. Prior Art

Diamond-anvil, high-pressure cells and apparatus for applying pressure to the cells are old and well known as evidenced by the U.S. patents to Weir et al U.S. Pat. No. 3,079,505 and Kirk U.S. Pat. No. 3,509,597. However, the cells disclosed in these patents are not adapted to containing a compressed gas at high pressure between the opposed diamonds and accordingly, the patents are silent as to any methods for introducing such a compressed gas into the cells.

The use of an apertured steel gasket between opposed diamond anvils to define a sample cell was disclosed in the "Annual Report of the Director" of the Carnegie Institution Geophysical Laboratory for the year July 1, 1977–June 30, 1978 which was issued in December 1978. While the gasket disclosed in this publication can be used to confine liquid or solid samples such as samples were placed in the cell by methods which were totally unsuitable for introducing a gas such as hydrogen.

U.S. Pat. No. 3,521,457 to Hemstreet relates to apparatus for making hydrogen "slush". The product formed differs substantially from that herein formed and the process steps bear little similarity to those of the present invention, the "slush" in fact being formed at low temperature using a "scraping" technique.

U.S. Pat. No. 3,521,458 to Huibers et al is, in overall substance, cumulative to the Hemstreet patent.

SUMMARY OF THE INVENTION

The present invention provides a unique method and apparatus for the introduction of hydrogen into a diamond-anvil, a high-pressure cell.

The method according to the present invention involves the introduction of a new and improved megabar cell having remotely operated pressure means into a bath of liquified hydrogen prior to moving the diamond anvils into pressure engagement with a stainless steel gasket. The liquified hydrogen will permeate the entire megabar cell construction through the usual viewing passages and upon operation of the remotely operated pressure applying means, the diamond anvils will be brought into engagement with the stainless steel gasket with sufficient pressure to sealingly trap a quantity of liquified hydrogen in an aperture or sample chamber located in the gasket between the two diamond anvils. The megabar cell with the pressure applying means still attached thereto is then generally removed from the liquified hydrogen bath and placed in a lever press for the application of further pressure to the liquified hydrogen at room temperatures for study of the liquified hydrogen through suitable viewing ports in the cell.

The modified megabar cell according to the present invention is comprised of a piston and cylinder arrangement having adjustable means for supporting two diamond anvils in opposed relation to each other for movement toward and away from each other. A stainless steel gasket is suitably mounted within the cylinder and is provided with an aperture in alignment with the diamond anvils. A thrust block is secured to the open end of the cylinder by screw means and bears against the end of the piston which protrudes from the cylinder so that upon rotation of the screw means into the cylinder the piston will be forced into the cylinder thereby forcing the diamond anvils into engagement with opposed surfaces of the gasket surrounding the aperture therein.

The apparatus for filling the aperture in the gasket between the diamond anvils with a liquid hydrogen is comprised of a vertically disposed open topped double walled elongated evacuated cylinder. The space between the double walls is completely filled with liquid nitrogen and a small amount of liquid helium is located in the bottom of the cylinder and a vessel containing liquid hydrogen is suspended within the cylinder immediately above the liquid helium. The megabar cell is suspended within the vessel containing the liquid hydrogen to a depth sufficient to submerge the viewing apertures thereby allowing liquid hydrogen to flow into the interior of the megabar cell. Remotely operated rod means are provided for rotating the screw means extending through the thrust block to force the thrust block toward the cylinder thereby forcing the piston into the cylinder to trap a quantity of liquid hydrogen within the aperture in the gasket between the diamond anvils.

The present invention also relates to a process for producing solid hydrogen which comprises: introducing liquid hydrogen into pressure-application means at cryogenic temperatures; sealing said liquid hydrogen into said pressure application means at cryogenic temperatures by the application of pressure thereto; maintaining said applied pressure; and increasing the pressure on said liquid hydrogen until said liquid hydrogen converts to solid form.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 4 is an exploded detail view of the apertured gasket and its relationship to one of the diamond anvils.

FIG. 5 is a schematic view of the apparatus according to the present invention for filling the megabar cell with liquid hydrogen.

FIG. 6 is a side elevation view of the megabar cell with the thrust block according to the present invention located within a lever type pressure applying means.

DETAILED DESCRIPTION OF THE INVENTION

Figure 1:
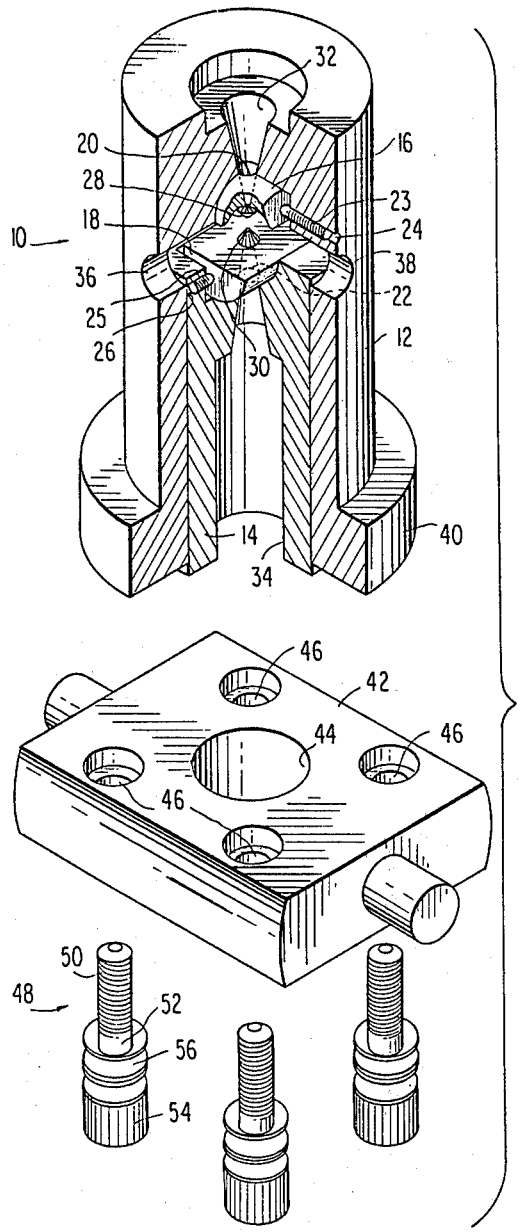
FIG. 1 is an exploded view partly in section showing the megabar cell, thrust block and screw means according to the present invention.

The megabar cell 10 according to the present invention is comprised of a cylinder 12 having a piston 14 slidably mounted therein. The piston 14 is of sufficient length so that its lower end protrudes beyond the open end of the cylinder in the operative position which will be described hereinafter. Semicylindrical support rockers 16 and 18 are located in complimentary recesses in the bottom of the cylinder 12 and the opposed surface of the piston 14. The support rockers are each adjustable about axes of rotation which are disposed orthogonal to each other. The rockers are constructed of tungsten carbide and are each provided with a hole or slot 20, 22 for experimental purposes involving X-ray diffraction techniques. A thin foil of zirconium metal (not shown) may be located between the rockers and the piston and cylinder to cushion the contact of the tungsten carbide rockers with the hardened tool steel of the piston and cylinder. Set screws 23 and 25 are located in two pairs of apertures 24, 26, only one of each pair being shown in FIG. 1, for bearing against the opposite ends of each rocker to secure the rockers in their adjusted positions. Two diamond anvils 28 and 30 are secured to the upper and lower rockers 16 and 18, respectively, with an epoxy resin. The axis of the diamonds are aligned with the apertures 20 and 22 which in turn are aligned with apertures 32 and 34 in the cylinder and piston, respectively. Additonal viewing apertures 36 and 38 are provided through the side walls of the cylinder 12 in alignment with the diamond anvils in order to carry out the precise adjustment of the rockers about their axes to achieve parallelism and to match the anvils. The detailed alignment procedure will be described in detail later in the present application.

The cylinder 12 is provided with an enlarged flange 40 extending about the end thereof through which the piston protrudes. Four equidistant threaded apertures (not shown) are located in the end of the flange 40 extending parallel to the axis of the piston and cylinder arrangement. A thrust block 42 is provided with a central aperture 44 which is disposed in alignment with the aperture 34 in the piston 14 and the annular end surface of the piston 14 is disposed in abutting relation with the surface of the thrust block 42 surrounding the aperture 44. Four equidistant smooth bores 46 are located about the central aperture 44 and are disposed in alignment with the threaded apertures in the flange 40 of the cylinder 12. Four screws 48 are each provided with a threaded portion 50 adapted to be threaded into the threaded apertures in the cylinder, a smooth shank portion 52 adapted to be located within the smooth bores 46 in the thrust block 42 and a knurled enlarged head portion 54. One or more Belleville springs 56 are located on the smooth shank of each screw 48 so that as the screws are threaded into the end of the cylinder 12 an axially directed force is applied by the heads 54 to the piston 14 through the Belleville springs 56 and the thrust block 42. Diametrically opposed screws are threaded in opposition directions so that as the screws are rotated there will not be any rotational torque applied to the piston and cylinder assembly.

Figure 2:
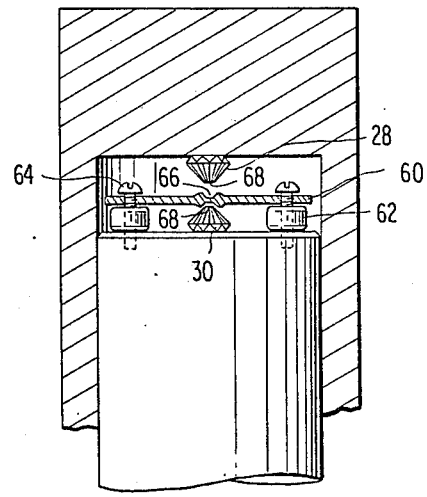
FIG. 2 is a spatial view of the half cylinders for supporting the diamond anvils and their relative degrees of freedom.
Figure 3:
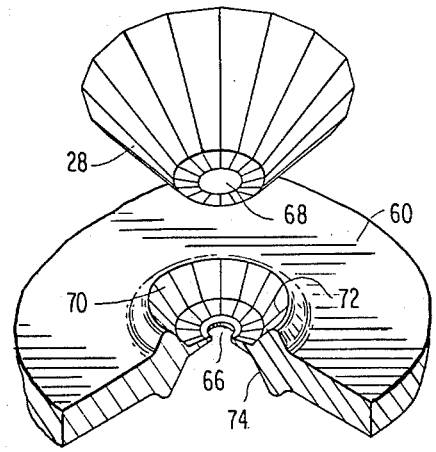
FIG. 3 is a sectional view of the megabar cell according to the present invention.

As best seen in FIGS. 2 and 3 a gasket 60 of T301 full-hardened stainless steel is loosely supported between the diamond anvils 28 and 30 by means of blocks 62 and screws 64 threaded into the blocks and the end of the piston through apertures in the ends of the gasket 60. The gasket is provided with an aperture 66 which is in alignment with the pressure face 68 of each anvil 28 and 30. The aperture in the gasket is surrounded by an annular extruded ridge of metal 70 having inner sloping surfaces 72 and 74 on opposite surfaces thereof corresponding to the surfaces of the diamonds 28 and 30. The annular ridge 70 is formed as a result of the pressure application of the diamonds to the gasket as is well known in the art. Thus, upon pressure engagement of the diamonds with the gasket, a sample cell will be defined by the wall of the aperture 66 and the pressure surfaces 68 of the diamond anvils 28 and 30.

The apparatus for filling the sample cell with hydrogen is comprised of an elongated evacuated double cylindrical vessel 78 having an outer wall 80 and an inner wall 82 spaced therefrom to define a chamber for the reception of liquid nitrogen. The inner chamber defined by the wall 82 is filled with a small amount of liquid helium. The upper end of the inner chamber is sealingly connected to and closed by a plate 84 which is suspended from any suitable support by means of rods 86 and 88. A second plate 90 is secured to and supported by the rods 86 and 88 in spaced parallel relation above the plate 84 and supports the knurled heads 92 of control rods 94 which rotatably extend through the plates 90 and 84. A hollow central supporting rod 96 is secured to the plates 84 and 90 and extends through these plates into the chamber defined by the inner wall 82 of the vessel 78. The lower end of the hollow support rod 96 is threadedly secured into the central aperture 44 of the thrust block to support the megabar cell 10, the construction of which is shown in detail in FIG. 1. The upper ends of the knurled heads of the screws 48 are each provided with a hexagonal recess 49 suitable for the reception of an Allen head wrench. The lower ends of the control rods 94 are provided with a hexagonal cross-sectional configuration and are adapted to be received within the recesses in the heads 54 of the screws 48. The upper ends of the knurled heads 92 of the control rods 94 are also provided with hexagonal recesses so that the control rods may either be rotated manually or be means of an Allen head wrench.

Hydrogen gas is supplied from pressurized tank 98 and is pumped through a liquid nitrogen trap 100 into a cup shaped vessel 102 through the flexible conduit 104 which extends downwardly through the hollow support rod 96 to the interior of the vessel 102. Suitable thermocouple wires 106 also extend down through the hollow support rod 96 and sense the interior and exterior temperatures of the vessel 102. The vessel 102 may be detachably secured to the megabar cell 10 by any suitable means (not shown) or may be supported from the plate 84 independently of the megabar cell 10.

Figure 7:
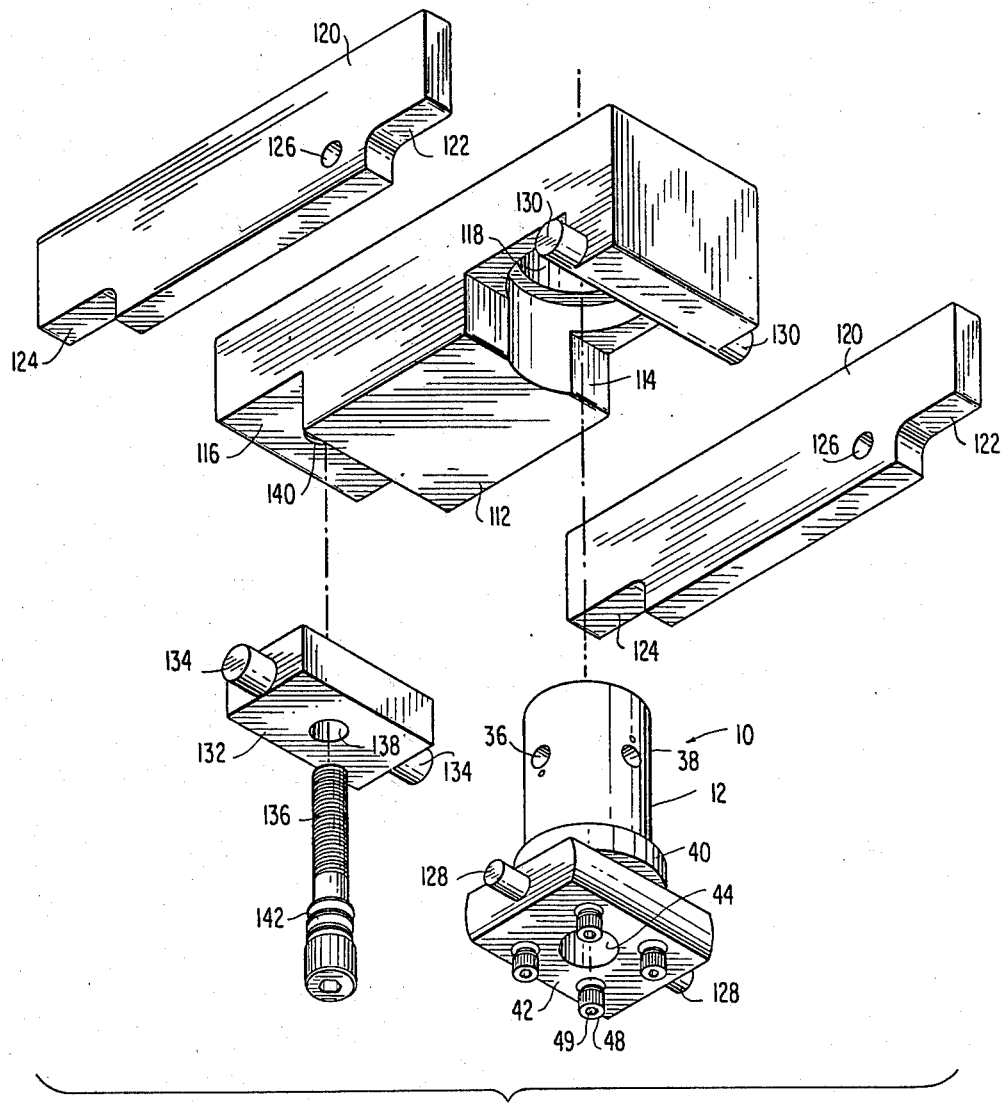
FIG. 7 is an exploded view of the lever press showing the relation of the parts thereof to the megabar cell.

After the liquid hydrogen in the vessel 102 permeates the entire cell 10 of the screws 48 are rotated to bring the diamond anvils 28 and 30 into engagement with surfaces 72 and 74 surrounding the aperture 66 in the gasket 60 to trap a quantity of liquid hydrogen within the aperture 66. The cell 10 is then removed and placed in a lever-type press 110 as shown in FIGS. 5-7.

The press 110 is comprised of a main block 112 having a front rectilinear notch 114 adjacent to but spaced inwardly from one end of the block and a second rectilinear notch 116 at the opposite end of the block. A cylindrical aperture 118 is located in the bottom of the notch 114 and extends entirely through the block 112. The cylinder 12 of the cell 10 is located in the aperture 118 with the thrust block 42 resting in the bottom of the notch 42.

A pair of identical levers 120 are each provided with notches 122, 124 at opposite ends thereof and a hole 126. The levers 120 are disposed on opposite ends of the block 112 and are supported on trunnions 128 which protrude from opposite ends of the thrust block 42. The fulcrum pins 130 located adjacent the notch 112 engage the notches 122 of the levers. A pressure block 132 have a pair of projections 134 is located in the notch 116 with the projections 134 engaging the notches 134 of levers 120. A bolt 136 extends through a smooth base 138 in the pressure block 132 and is threaded into a threaded aperture 140 in the bottom of notch 116 in block 112. A plurality of Belleville spring washers 142 surround the bolt 136. Upon tightening of the bolt the pressure block 132 will pivot the ends of the lever 120 in contact therewith counter-clockwise about pins 130 as shown in FIG. 5 to force the piston 14 into the cylinder 12 to increase the pressure on the hydrogen in the gasket.

Where processing is carried out entirely at cryogenic temperature, of course conventional remote control means are used for all manipulations; in distinction, where final pressure elevation is at room temperature or above, such are not required.

Turning to the process of the present invention in more detail, as earlier set forth it broadly comprises four steps:

1. Introducing liquid hydrogen into pressure-application means as earlier described at cryogenic temperature, i.e., at about 17° K.;

2. Sealing the liquid hydrogen into the pressure-application means at cryogenic temperature by applying pressure thereto;

(As will be appreciated by one skilled in the art, a sample chamber containing the liquid hydrogen must be maintained at a pressure slightly greater than that applied to the liquid hydrogen to prevent leakage thereof.)

3. While substantially maintaining the pressure above mentioned, the liquid hydrogen is then generally brought to approximately room temperature; (As will be appreciated by one skilled in the art, temperatures other than room temperature can be used, but considering the following processing step it is most convenient to operate at room temperature.) and 4. Finally, once the liquid is at approximately room temperature, increasing the pressure until the liquid hydrogen converts to solid form.

In the context of the process of the present invention, the "maintaining" of the pressure in step 3 above is to insure there is no hydrogen leakage. Obviously, one could merely seal and continue directly with pressure elevation without a separate, distinct "maintaining" step.

While the process of the present invention involves several relatively straight forward process steps, there are several criteria which must be observed in our currently preferred modes of practicing the invention, and these are set forth below.

First, the extremely high pressures necessary to practice the present invention are most conveniently obtained by using a diamond anvil press as earlier described, i.e., involving the use of two diamond anvils (0.3 Caret brilliant cut diamonds; octagonal anvil faces ground flat or beveled to 1°~2° with low strain birefringance: 2 to 10×10$^{-5}$) spaced by a stainless steel gasket (thickness: 250 $\mu$m) which contains the liquid hydrogen sample of the present invention. The stainless steel gasket is commercially obtained from Ulbrich Stainless Steels & Special Metals, Inc. under the name T301 Full Hardened stainless steel, the gasket being, of course, work hardened.

In actuality, we initially begin with two gaskets which are essentially identical except one gasket has a sample chamber (which will be used in the actual process run) and the second gasket does not have a sample chamber; this second gasket is used for initial calibration of the diamond anvils to ensure precise alignment to avoid diamond fracture.

After the above procedure, the following optional alignment may be performed. The gasket is removed and solid, powdered AgI is coated on to the faces of the diamond anvils in thin layer form, i.e., about 10 microns thick. Pressure is then applied to the diamond anvils to bring the faces thereof into contact and the phase transition of AgI observed. AgI I converts to AgI II at 3 Kbars and AgI II converts to AgI III at 100 Kbars, and thus we typically apply pressure in excess of 100 Kbars during this step of the alignment procedure.

The Becke line, which reflects a difference in phase density, is visually observed, and by observing the Becke line the diamond anvil faces can be brought into precise alignment. If necessary, during this alignment step the carbide rockers can be used to gain a more precise alignment of the diamond anvil faces, with our goal being substantially zero torque on the diamond anvil faces during active processing.

We first align the diamond anvils as closely as possible visually, i.e., until the last light interference fring disappears, the gasket without the sample chamber being inserted between the diamond anvils, the upper face of the gasket containing a thin layer of ground ruby powder slightly less than 10 microns in thickness, the powder being ground to 10 microns or less in size. The ground ruby powder is Al$_2$O$_3$ doped with 0.55% Cr.

It is to be noted that while we use single crystal diamonds, we believe for commercial processing other pressure application means will probably be used due to cost considerations, e.g., polycrystalline diamonds and the like.

Next, pressure (e.g., up to 700 Kbars) is applied to the gasket by the diamond anvils and the ground ruby powder is excited with a He-Cd laser (542 nm) with increasing pressure.

The frequency of the fluorescent emission of the rubies changes with pressure (the ruby R$_1$ fluorescent line), and, accordingly, from a pre-prepared calibration curve, any pressure gradient across the gasket can be measured and, if the pressure gradient is not symmetrical to the axis of the anvils the diamond anvils can be realigned by realigning the carbide rockers.

Following the above procedure, the gasket with the sample chamber is inserted between the diamond anvil faces and processing is begun. Typically, we indent the gasket and then drill through the gasket to form the sample chamber which will be sealed by the opposing diamond anvils upon pressure application. The gasket, though work hardened as obtained, is, we believe, further work hardened during the pressure application according to the present invention and we believe this assists in achieving the desired sealing effect. Specifically, in the pressure range 50 to 200 Kbars the gasket thins to 10–20 $\mu$m between the anvil faces.

The first step in the processing is to insert the pressure application means into cryogenic apparatus as earlier described, i.e., liquid N$_2$ bath surrounding a liquid He bath above which is a container of liquid $H_2$. Thermocouples are utilized to ensure that the pressure application means is disposed at a proper location in the bath so that liquid hydrogen is introduced into the sample chamber, actually the sample chamber being filled to overflowing with liquid hydrogen. A few micrograms of small ruby crystals (10–20 $\mu$m in diameter) are also present in the sample chamber to permit pressure measurement using the National Bureau of Standards technique with reference to the precalibrated pressure shift of the ruby fluorescent $R_1$ line.

It is to be noted that we use rubies for pressure measurements because of the availability of the National Bureau of Standards calibration curves. Other materials could, of course, be used but it would be necessary to go to the expense of generating calibration curves therefore.

In a similar fashion, gaskets other than T301 stainless steel can be used, so lone as the desired sealing effects at the high pressures of operation are obtained.

Once the liquid hydrogen fills the sample chamber (250 $\mu$m in diameter), pressure is applied to the sample chamber at cryogenic temperatures, i.e., at around 17° K.

The metal of the gasket, with the advancing pressure, will undergo plastic flow with the result, if diamond alignment is precise as above described, that a sealing area of the metal gasket surrounding the sample chamber will have a pressure of at least 10 to 20% higher than that on the liquid hydrogen in the sample chamber. While this pressure differential is not critical, we have found the above pressure differential to be adequate for our purposes in ensuring no liquid $H_2$ leakage.

Typically, the pressure applied to the liquid hydrogen sample at this stage is on the order of 20 Kbars.

While the exact pressure applied during this stage of the process is not overly critical except to ensure that the liquid hydrogen is sealed in the sample chamber without possibility of substantial escape, based on our current work we believe that the pressure applied in the cryostat should be on the order of about 40 to about 60 Kbars.

The pressure application means is then typically removed from the cryostat and is generally permitted to rise in temperature; while the temperature need not be room temperature, it is much easier work with the processing apparatus at room temperature since remote control means as are required for processing at cryogenic temperature are no longer necessary.

Our current results indicate that temperatures of greater than 17° K. to about 4,000° K. can be used during final pressure elevation, but as indicated processing is most generally at about 298° K. If final pressure elevation is in the cryostat, the temperature is above 17° K. For high temperature pressure elevation, a laser can be used to heat the sample; in fact, operation at high temperature (with laser heating) may prove to be the most effective way to obtain metallic hydrogen.

In this regard, while 57 Kbars at 298° K. provides solid hydrogen, lesser final pressures are sufficient to obtain solid hydrogen at temperatures below 298° K. but above 17° K. while higher final pressures are needed at above 298° K. At present, we do not raise to final pressure at 17° K., rather, the temperature must be greater than 17° K. at the time of final pressure elevation.

Hereafter, we merely discuss the invention in terms of such "room temperature" processing.

After the liquid hydrogen is at room temperature, the pressure obtained in the cryostat still being substantially maintained, the pressure on the liquid hydrogen is then increased at room temperature, with the Raman spectra of the liquid hydrogen sample being optically observed as pressure is increased.

Once the pressure reaches 57 Kbars, the hydrogen converts to clear crystals (solid), and will maintain this form until the release of pressure, whereafter the hydrogen will revert from the solid to the fluid to the gaseous form.

At this stage, the product of the present invention can be used in any application where a dense, compact form of hydrogen is needed and elevated pressure environments are available, for example, as a rocket fuel, as an explosive, as a source of hydrogen for fusion and the like.

As the pressure is increased over 57 Kbars, the clear hydrogen crystals merge into solid form without grain boundaries and the refractive index increases. At 360 Kbars the visible boundary line between the ruby crystals and the solid hydrogen disappears; the specific gravity of the solid hydrogen is calculated to be about 0.6~0.7. From 360~650 Kbars the refractive index of the solid hydrogen continues to increase.

If the pressure is further increased, for example, to pressures on the order of 1 Megabar or higher, it is our belief that the resulting solid hydrogen will invert to the metallic state and will remain in that state even at reduced pressures.

In this last condition, the density of the solid hydrogen is very high and, in addition to the uses above described, it is our belief that the solid hydrogen will be a highly efficient super conductor. In this latter state, we believe, the metallic hydrogen will have a specific gravity of about 1.0.

Based on calculations, solid hydrogen of a density of about 1 g/cc will have an extremely high specific impulse on the order of 1,400 seconds, far superior to materials such as conventionally used JP-4 and LOX, which have specific impulses of about 400 seconds.

While the invention has been particularly shown and described with reference to a preferred embodiment thereof, it will be understood by those in the art that various changes in form and details may be made therein without departing from the spirit and scope of the invention.

We claim:

1. A method for producing a solid hydrogen in a a pressure applying apparatus having a chamber defined by diamond anvil means disposed on opposite sides of an apertured gasket comprising:
   immersing said apparatus in a liquid hydrogen bath with said chamber open,
   closing said chamber while said apparatus is immersed in said bath to trap an amount of liquid hydrogen in said chamber and
   increasing the pressure on said liquid hydrogen until said hydrogen converts to sold form.

2. A process for producing solid hydrogen as set forth in claim 1 further comprising removing said pressure applying apparatus from said bath allowing the temperature of said apparatus to rise to room temperature prior to increasing the pressure on the liquid hydrogen to produce solid hydrogen.

* * * * *